(12) United States Patent
Ammann

(10) Patent No.: US 6,280,124 B1
(45) Date of Patent: Aug. 28, 2001

(54) SPINDLE WITH LINEAR MOTOR FOR AXIALLY MOVING A TOOL

(75) Inventor: Beat Ammann, Sagno (CH)

(73) Assignee: Ballado Investments Inc., Panama (PA)

( * ) Notice: Subject to any disclaimer, the term of this patent is extended or adjusted under 35 U.S.C. 154(b) by 0 days.

(21) Appl. No.: 09/453,818

(22) Filed: Dec. 3, 1999

(30) Foreign Application Priority Data

Mar. 18, 1999 (CH) .................................................. 514/99

(51) Int. Cl.⁷ .................................................. B23B 47/18
(52) U.S. Cl. ............................. 408/129; 408/124; 310/12
(58) Field of Search .................................... 408/124, 129; 409/231; 310/12

(56) References Cited

U.S. PATENT DOCUMENTS

| | | | |
|---|---|---|---|
| 4,869,626 | * 9/1989 | Kosmowski | 408/129 |
| 5,598,044 | * 1/1997 | Satomi et al. | 310/12 |
| 5,734,209 | * 3/1998 | Hallidy | 310/12 |
| 5,997,223 | * 12/1999 | Kosmowski | 408/124 |

* cited by examiner

Primary Examiner—Steven C. Bishop
(74) Attorney, Agent, or Firm—Young & Thompson

(57) ABSTRACT

A tool-holding spindle (1) for machining with the removal of swarf in which rotary movement of the spindle (1) and a tool (2) coaxially fixed to it and axial forward and backward movement of the tool (2) are required, in which the tool (2) is fixed in a hollow member (7) which can move axially and rotate with respect to the body (1d) of the spindle (1) within which it is housed, magnets (4n) forming part of a linear motor (4) whose stator windings (4s) are housed in the body (1d) of the said spindle (1) around the hollow member (7) being fixed to the said hollow member (7), is described.

9 Claims, 2 Drawing Sheets

SPINDLE WITH LINEAR MOTOR FOR AXIALLY MOVING A TOOL

BACKGROUND OF THE INVENTION

This invention relates to the field of machine tools which carry out machining by the removal of swarf, and more particularly those of them which require rotary working motion of the tool as well as further linear axial forward and backward motion (to carry out the working travel and then return to the initial position).

According to the present state of the art the said axial motion is normally provided by either a linear motor or mechanical movement systems of similar effect which act on the slide which supports the tool-bearing chuck as a whole. (Both these systems are well-known to those skilled in the art).

The main disadvantages resulting from such systems are the relative slowness with which they operate, structural complexity and relatively large dimensions for the tool-holding stations, factors which obviously have adverse repercussions on costs.

SUMMARY OF THE INVENTION

The inventor of this invention has conceived a solution which avoids all the abovementioned disadvantages and which essentially comprises causing forward and backward movements of the tool to be performed by a linear motor comprising a stator with electromagnetic induction windings housed in the body of the spindle and a moving part provided by permanent magnets (the fields from which interact with those created by the said windings) integrally attached the tool.

If the current passing through the said stator windings is suitably directed and if the said permanent magnets are orientated suitably and in an appropriate way, it is then readily possible to move the tool axially with appreciable speed as a result of the low mass of the moving parts, including the tool.

Tests performed by the inventor on prototype spindles according to the invention have in fact shown the possibility that a tool can be moved axially in both directions, imparting to it an acceleration which is up to six times the acceleration of gravity g.

This means that a tool can be moved by imparting an acceleration of approximately 59 M/s$^2$ to it; this fact provides a clear idea of the speed of operation of a spindle according to the invention.

BRIEF DESCRIPTION OF THE DRAWINGS

A more detailed description of a preferred embodiment of a tool-holding spindle according to the invention will now be provided, and in so doing reference will also be made to the appended drawings, which show.

DESCRIPTION OF THE PREFERRED EMBODIMENTS

Figure 1:
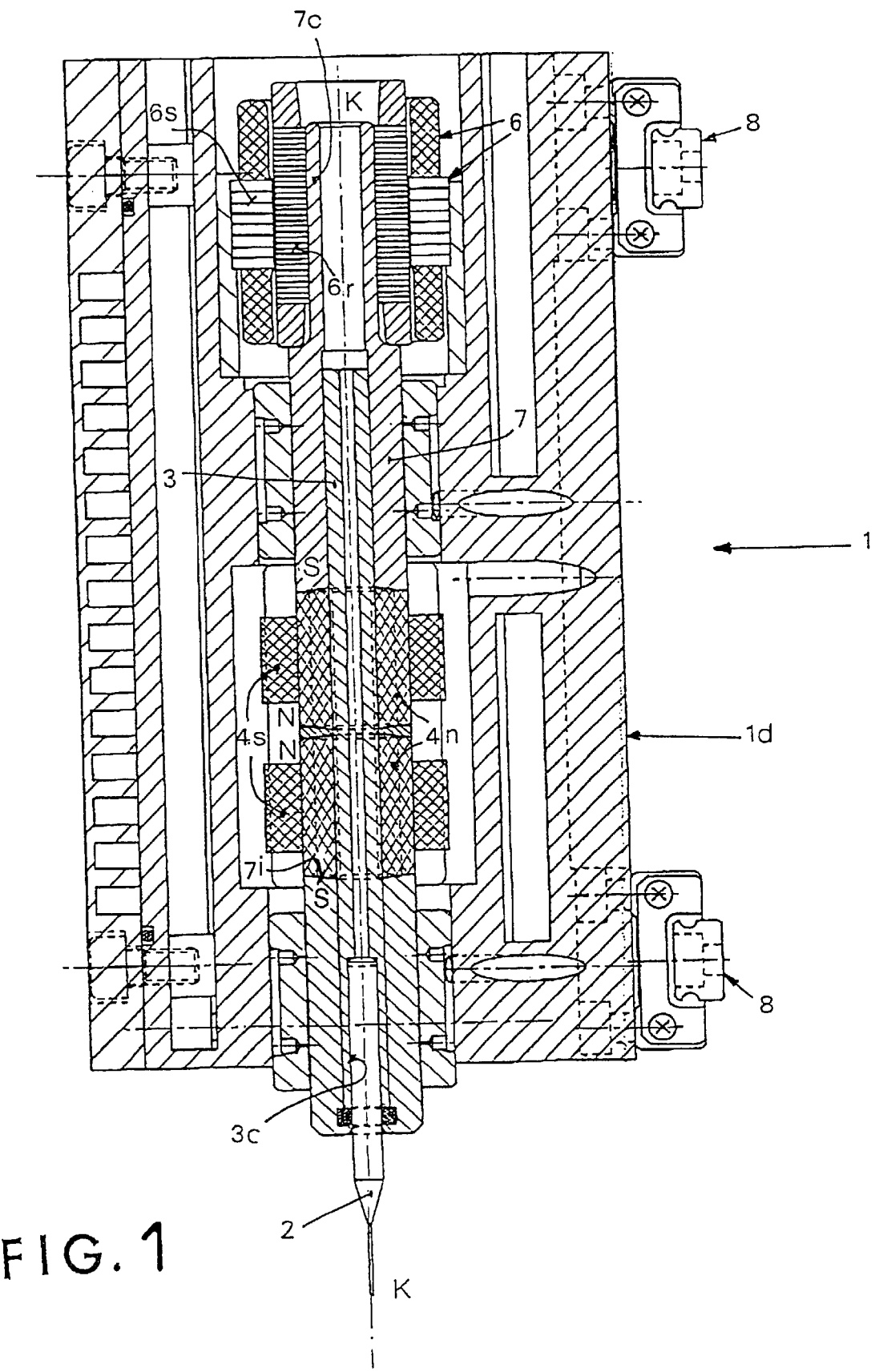
In FIG. 1, a longitudinal cross section of the said embodiment of a spindle according to the invention, In FIG. 2, a longitudinal cross section of only one hollow member forming part of the spindle within which a tool is secured, In FIG. 3, a transverse cross section of the hollow member in FIG. 2 in the area in which the moving permanent magnets of the linear motor are applied.
Figure 2:
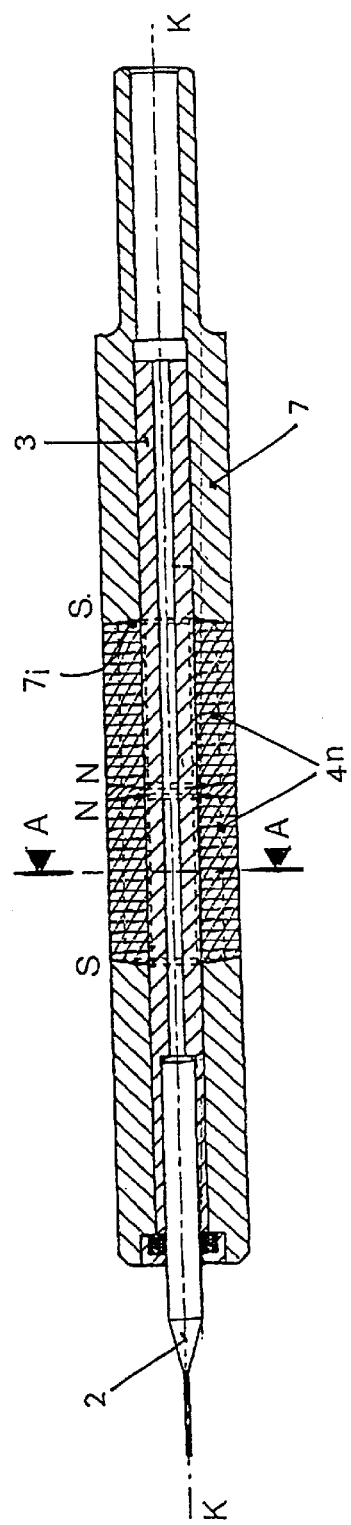
Figure 3:
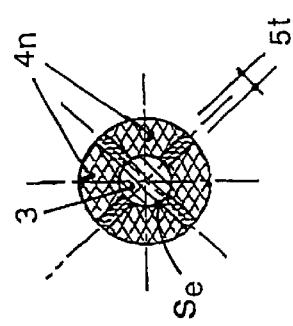

Considering first FIG. 1: this shows how within body 1d of a spindle 1 there is a hollow member 7 connected in such a way that it can rotate and move axially with respect to it.

A small shaft 3 (which is also hollow in the case in question), which has a cavity 3c within which a tool 2 is fixed, is fixed coaxially and integrally with said hollow member 7.

On the outer surface Se of said shaft 3 there are fixed a plurality of permanent magnets 4n which are housed in a suitable recess 7i provided in said hollow member 7. These magnets 4n are the moving part of a linear motor 4 whose stator windings 4s are located around hollow member 7 and anchored in body 1d of the spindle.

In the case in point these windings are simply wound circumferentially around hollow member 7 and said permanent magnets 4n, and magnets 4n themselves have their N,S polarities orientated in such a way that they are subject to an axial thrust in two directions as a result of the magnetic fields generated by the passage of current running in opposite directions through the said stator windings (4s).

By suitably directing the said currents it is therefore possible to move hollow member 7, and consequently tool 2, axially, causing the latter to perform its forward working movement and its disengaging and return movement to initial stand-by conditions.

One end of said hollow member 7, free end 7e located at the opposite end from tool 2, has fixed to it rotor 6r of an electric motor 6 whose stator 6s has its windings housed and anchored in the body 1d of spindle 1.

By starting aforesaid electric motor 6, hollow member 7 and tool 2 which is integral with it are caused to rotate at the desired working speed (up to 300,000 rpm in the case of systems of small mass and little resistance to forward movement).

Thus the conditions for moving tool 2 simultaneously with rotary movement about its own axis K—K (by means of electric motor 5) and axial movement in alternating directions along that axis (by means of linear motor 4) are created. Given the small size of the mass of the entire moving part of the equipment, that is the system comprising hollow member 7, magnets 4n, the small shaft and tool 2, high values of the various speeds already Mentioned can be achieved without it being necessary to move systems of appreciable mass which incorporate appreciable inertia, as in the state of the art.

The body 1d of the spindle 1 is attached to a machine tool (not shown) that uses the spindle 1 by means 8. Means 8 permits the spindle 1 to move in a perpendicular direction with respect to the axis K—K of the tool 2.

The result which the inventor set himself, that is of having a tool-holding spindle of high performance with a high productive capacity is therefore achieved.

In the particular embodiment illustrated heretofore the inventor provides for the use of two sets of 4 magnets 4n of boron-iron-neodymium with S—N polar axes parallel to the K—K axis and spaced apart by radially oriented gap spaces 5t which can be filled wits one of those synthetic resins well known to those skilled in the art of magnetic and electromagnetic equipment; other types of magnets, which may be arranged in different ways, may also be used.

Again in the case in question, electric motor 6 which causes hollow member 7 and tool 2 to rotate is of the asynchronous type, with a squirrel cage winding, but other types of motor may also be used without adverse consequences.

Similarly, all the component parts such as hollow member 7, small shaft 3 and the various parts comprising linear motor 4 may be different in nature, shape, position and attachment with respect to the aim of providing a spindle according to the invention which differs from that described, but still derives from the teaching herein. It is obvious that these embodiments will also lie within the scope of the protection conferred by this patent application.

What is claimed is:

1. A tool-holding spindle in which a tool held by the spindle rotates and moves axially, the spindle comprising:
    a hollow member that moves axially and rotates, said hollow member being housed within a body of the spindle and being arranged and adapted to fixedly hold a tool; and
    a linear motor that moves said hollow member axially and that comprises permanent magnets and stator windings, said permanent magnets being embedded in said hollow member, said stator windings being housed in said body of the spindle around said hollow member.

2. The spindle according to claim 1, further comprising a small shaft housed coaxially within and integral with said hollow member, said small shaft comprising a cavity in which a tool is held.

3. The spindle according to claim 2, wherein said permanent magnets have a transverse cross-section in a shape of an annular sector with a shorter curved side adhering to a cylindrical outer surface of said small shaft and a longer curved side conforming to an exterior shape of said hollow member.

4. The spindle according to claim 1, wherein said permanent magnets are oriented to thrust axially by an effect of electromagnetic fields generated by a passage of currents that run in opposite directions within said stator windings, said stator windings being wound circumferentially around said hollow member.

5. The spindle according to claim 1, wherein an end of said hollow member is attached to a rotor of an electric motor that rotates said hollow member, said electric motor having a stator fixed to said body of the spindle.

6. The spindle according to claim 5, wherein said electric motor has a three phase stator and a rotor with a squirrel cage winding.

7. The spindle according to claim 1, wherein said body of the spindle is attached to a machine tool by means for permitting the spindle to move in a perpendicular direction to a longitudinal axis of said hollow member.

8. A tool-holding spindle in which a tool held by the chuck spindle and moves axially, the spindle comprising:
    a hollow member that moves coaxially and rotates, said hollow member being housed within a body of the spindle and being arranged and adapted to fixedly hold a tool;
    a small shaft housed coaxially within and integral with said hollow member, said small shaft comprising a cavity in which a tool is held; and
    a linear motor that moves said hollow member axially and that comprises permanent magnets and stator windings, said permanent magnets being fixed to said hollow member, said stator windings being housed in said body of the spindle around said hollow member,
        wherein said permanent magnets have a transverse cross-section in a shape of an annular sector with a shorter curved side adhering to a cylindrical outer surface of said small shaft and a longer curved side conforming to an exterior shape of said hollow member; and
        wherein said permanent magnets are boron-iron-neodymium, are arranged in two groups of four magnets each, and are laterally separated from each other by a radially oriented air gap.

9. A tool-holding spindle in which a tool held by the spindle rotates and moves axially, the spindle comprising:
    a hollow member that moves axially and rotates, said hollow member being housed within a body of the spindle and being arranged and adapted to fixedly hold a tool;
    a small shaft housed coaxially within and integral with said hollow member, said small shaft comprising a cavity in which a tool is held; and
    a linear motor that moves said hollow member axially comprising permanent magnets and stator windings, said permanent magnets being fixed to said hollow member, said stator windings being housed in said body of the spindle around said hollow member,
        wherein said permanent magnets have a transverse cross-section in a shape of an annular sector with a shorter curved side adhering to a cylindrical outer surface of said small shaft and a longer curved side conforming to an exterior shape of said hollow member, and
        wherein said permanent magnets have north/south axes oriented parallel to a longitudinal axis of said hollow member.

* * * * *